United States Patent [19]

Kalman

[11] Patent Number: 5,552,586
[45] Date of Patent: Sep. 3, 1996

[54] PERSONAL ID MEMORY CARD/AGENCY

[76] Inventor: Richard L. Kalman, 2734 Lantz Ave., San Jose, Calif. 95124

[21] Appl. No.: 468,626

[22] Filed: Jun. 6, 1995

Related U.S. Application Data

[63] Continuation of Ser. No. 260,356, Jun. 15, 1994, abandoned.

[51] Int. Cl.$^6$ .................................................. G06K 5/00
[52] U.S. Cl. ............................... 235/380; 364/413.09
[58] Field of Search ................................ 235/380, 382, 235/382.5, 375, 379; 364/710.1, 710, 705, 709, 413.09, 413.02, 413.11

[56] References Cited

U.S. PATENT DOCUMENTS

| | | | |
|---|---|---|---|
| 4,491,725 | 1/1985 | Pritchard | 235/375 |
| 4,780,839 | 10/1988 | Hirayama | 364/710.01 |
| 4,797,543 | 1/1989 | Watanabe | 235/380 |
| 4,816,653 | 3/1989 | Anderl et al. | 235/380 |
| 4,831,242 | 5/1989 | Englehardt et al. | 235/382 |
| 4,853,522 | 8/1989 | Ogasawara | 235/380 |
| 5,002,062 | 3/1991 | Suzuki | 128/696 |
| 5,019,697 | 5/1991 | Postman | 235/442 |
| 5,227,612 | 7/1993 | Le Roux | 235/379 |
| 5,228,094 | 7/1993 | Villa | 382/4 |
| 5,241,161 | 8/1993 | Zuta | 235/382 |
| 5,291,399 | 3/1994 | Chaco | 364/413.02 |
| 5,307,263 | 4/1994 | Brown | 364/413.09 |
| 5,327,555 | 7/1994 | Anderson | 395/600 |
| 5,459,304 | 10/1995 | Eisenmann | 235/382 |

Primary Examiner—Donald T. Hajec
Assistant Examiner—Le Thien Minh
Attorney, Agent, or Firm—Harold L. Jackson

[57] ABSTRACT

A interagency planning document for treatment of an agency client is electronically created and stored in a memory card which is provided to the client. The client retains the memory card for record purposes. Information on the memory card can be shared with other agencies using a palmtop computer and electronic mail or bulletin boards. The planning document can be updated on a continual basis in the memory card eliminating the need for the client to amass large amounts of paperwork. The palmtop computer may contain various databases which may be common to a number of agencies to reduce the vast amount of paperwork and documentation preparation time presently complicating client-agency relationships.

20 Claims, 2 Drawing Sheets

PERSONAL ID MEMORY CARD/AGENCY

RELATED APPLICATION

This application is a continuation of application Ser. No. 08/260,356, filed Jun. 15, 1994 now abandoned, entitled Personal ID Memory Card/Agency.

BACKGROUND OF THE INVENTION

1. Field of the Invention

The invention relates generally to data memory cards and more particularly to the creation, storage, processing and sharing of documentation between agencies and their clients.

2. Description of Related Art

Persons needing federal, state or local support for any number of reasons often must deal with a number of agencies to obtain the benefits or services sought. For example, individuals that are handicapped with a developmental disability such as mental retardation have continual support through various agencies such as California Department of Education, California Employment Development Department, California Department of Developmental Services, California Bureau of Mental Health, California Community College System, California State University System, California Job Training Partnership Administration, California Department of Rehabilitation, Social Security Administration, and California Family Resource Centers. Such agencies may be involved through the educational and vocational training period of such an individual during which time the individual's development is assessed, planned, implemented, reassessed on a continual basis. In the process of an individual's development, the individual along with his (or her) parents or guardian continually meet with various agencies, such as the agencies listed above, to obtain the development or other services needed by the individual. Typically, a case manager or liaison and one or more participating local agencies meets with the parent and individual to provide the planning and coordination of services necessary to receive the benefits from the various agencies for the individuals next developmental phase. Such meetings are typically scheduled on a yearly or more frequent basis. In the planning meeting, other agencies may be brought in depending on the assessment of the individual's needs and the activity or experience to be provided to the individual. Over the early life of the individual many meetings may take place with assessments, notes, recommendations and other documentation from various agencies. All such information will be used in coming up with a planning document which will continually be revised and updated. The volume of paperwork, documentation and forms in this process can become overwhelming to the family as they work with a number of agencies. The present documentation system for dealing with agencies is unduly burdensome for individuals and their families because of duplicative data collection, delays in multi agency collaboration, and inexhaustive forms and paperwork.

For example, an individual with mild mental retardation may be the client of a local regional center concurrently receiving services from special education. Regular meetings are held to develop an individual's yearly plan for his vocational education. The planning meetings could include the individual's parents, his teachers, a psychologist, speech and language specialist, a regional center case manager and transitional specialist, representing perhaps various agencies. Meeting notes are taken by the various participants and a record of the planning meeting documented in writing by the various participants. The different agency representatives typically have separate planning documents and forms provided for by their respective agency policies and procedures. The family is given a number of paper documents from the planning meeting which may include notes, forms and planning documents from the various participants and their respective agencies. This governmental paper documentation can become overwhelming to the family and individual and cause delays in dealing with future problems or other agencies. Further, much of the paperwork becomes duplicative in future meeting or in dealings with other agencies causing the family and individual to spend a lot of extra time and effort in obtaining and utilizing the services and benefits of the cognizant governmental agencies. A need therefore exits for a method for a family and individual to deal with the governmental agencies, and the various agencies to deal with each other, in providing assistance to individuals that eases the burden of the family in obtaining such assistance for the individual.

Attempts at designing information gathering and processing systems have been made but none that would assist the individual and agencies in the aforedescribed circumstances. For example, U.S. Patent issued to Lawrence Prichard discloses a medical insurance verification and processing system which uses a medical information card. The card is inserted into a local entry terminal which communicates with a central computer to provide insurance information. The card may include an integrated circuit for updating, storing or processing information. An article in a December, 1993 Wall Street Journal issue discloses a memory card used for recording a patient's insurance status, name, address, next of kin, doctor, medical condition, past surgeries and pharmaceutical records. The card can be read by an emergency medical technician with a pocket computer and help determine whether an unconscious person has diabetes, a heart condition or is an alcoholic, for example. An insurance smart card used by French Mutual Insurance (disclosed in a brochure entitled Mutuelles de France—C3S) provides an insured with a portable administration file, portable medical file and a means of payment. The medical file contains the card bearer's emergency health details and a data zone for preventative health care for the individual. Other examples illustrating uses of memory cards and management of transactions are illustrated in U.S. Pat. No. 5,241,161; U.S. Pat. No. 5,228,094; U.S. Pat. No. 5,227,612; U.S. Pat. No. 5,019,697; U.S. Pat. No. 4,853,522; U.S. Pat. No. 4,831,242, and U.S. Pat. No. 4,816,653. None of these patents disclose a viable solution. It would therefore be an advancement in the art to provide a method to facilitate the information handling in the client relationship between agencies and individuals.

SUMMARY OF THE INVENTION

The object of this invention is to make it possible for people to deal with governmental agencies and other entities, and agencies to work with each other, without the vast amount of paperwork presently involved. The invention cuts through the problem of agency paperwork inefficiencies by utilizing memory cards in the process of creating and communicating the documentation necessary for agencies to serve their clients. Clients are provided with memory cards with documentation downloaded therein. These memory cards can be updated or the data therein used in subsequent dealings with agencies. Further, the documentation from the memory cards can be telecommunicated between agencies and clients utilizing palmtop computers, modems via electronic mail and bulletin boards.

The palmtop computers may access via modem, an electronic bulletin board service which houses a dynamic resource database providing information that may be needed by the agencies in coordinating or determining the appropriate services for the individual. Various other agencies would have access to the same or similar databases.

DESCRIPTION OF PREFERRED EMBODIMENTS

Figure 1:
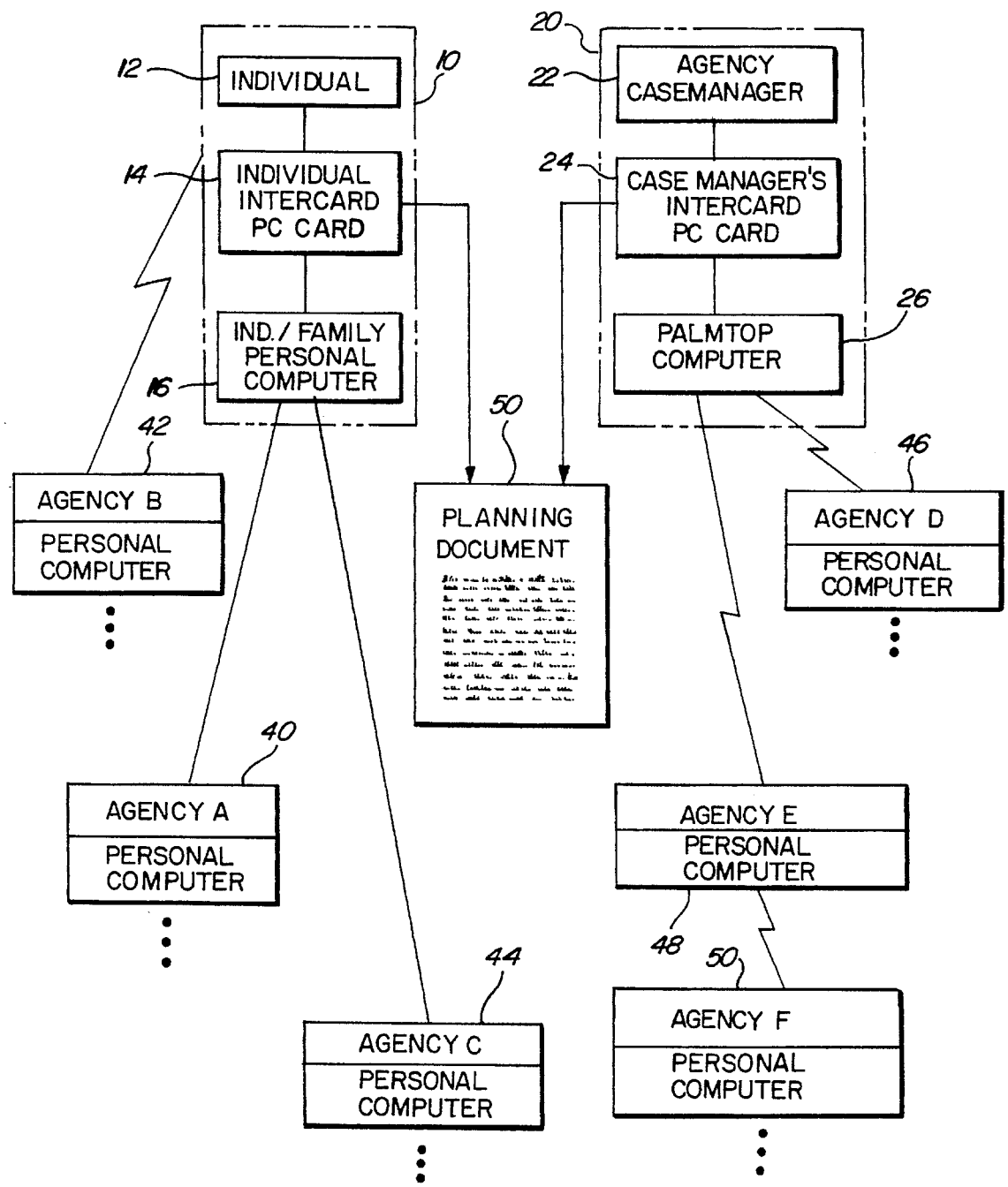
FIG. 1 is a block diagram illustrating the relationship of the agencies and clients and planning documents created as part of this relationship, and the method for electronically handling the planning document between them.
Figure 2:
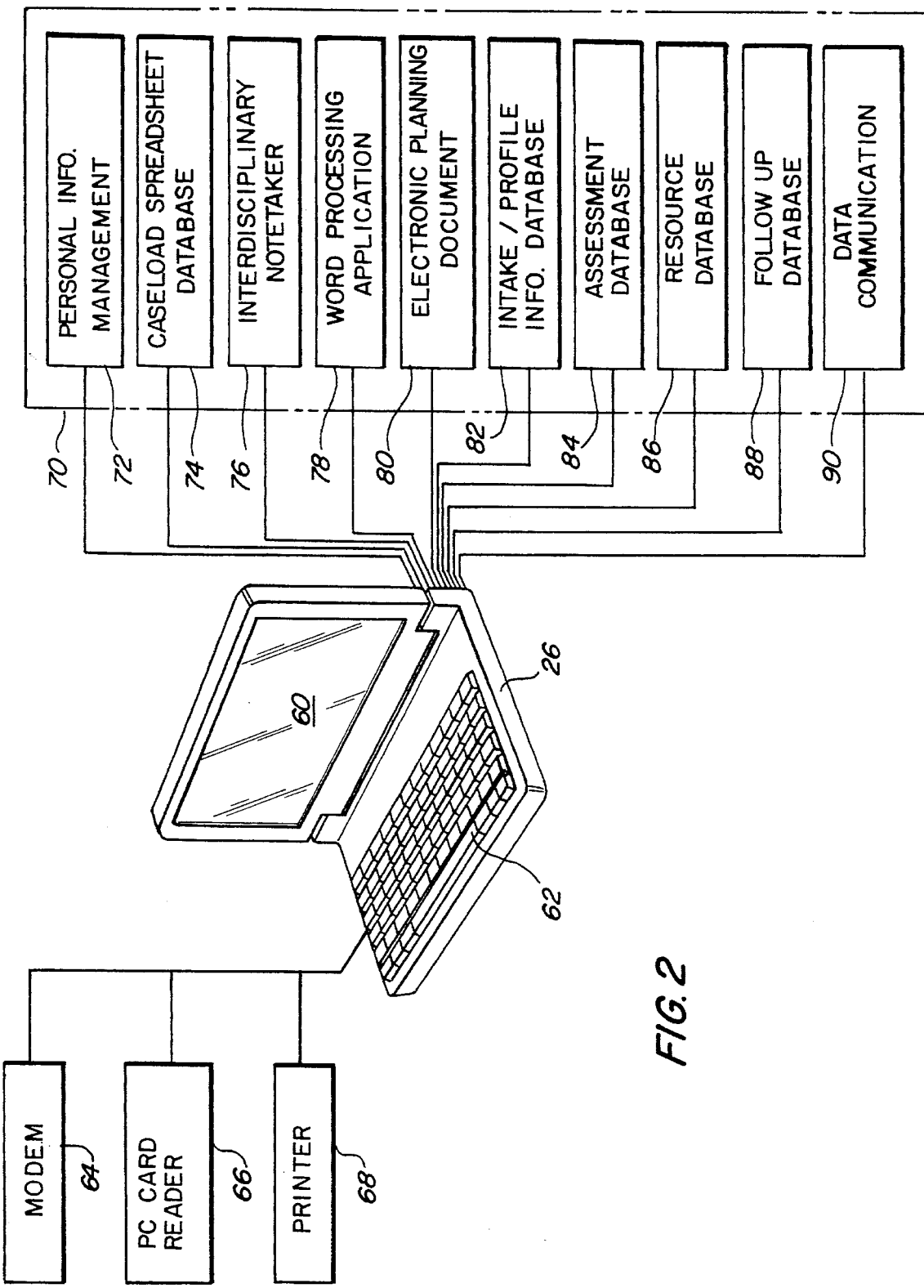
FIG. 2 shows the palmtop computer of FIG. 1 used in the preparation of planning documents and electronic communication thereof.

Referring now with more particularity to the drawings, there is illustrated in FIGS. 1 and 2 a block diagram of the method for creating a planning document between the various agencies and the families and the individual for which the plan will benefit. There is illustrated a family unit 10 and an agency 20, which agency has a case manager 22 that is primarily responsible for representing the individual 12 in coordinating the agency assistance for the individual along with other cognizant agencies and other participants. More specifically, the case manager 22 may provide the lead role in setting up the planning document 30 for the individual 12 in his treatment or education, for example. The individual and his (or her) family, namely the family unit 10, are provided with a PC card 14, which may be a magnetic medium card or an SRAM or flash RAM memory card having 16 to 512 kilobytes or more of memory. For assurance, the family unit may be provided with two PC Cards, one card being the primary card and the other card being a backup card. The case manager also has his own PC Card 24, which may be a one megabyte or larger PCMCIA SRAM or flash RAM card, for example. The case manager PC Card will typically have a larger memory to accommodate the many clients that he may have to serve. The PC Cards have a size similar to conventional credit cards. These cards are therefore convenient and easily carried and stored. As an alternative, a "smart card" can be employed which has an integrated circuit molded with the card, which integrated circuit can store, update and process information, this card being readable/writable by the palmtop computer via PCMCIA port or via and external "smart" card read/write terminal.

The case manager 22 is provided with a palmtop computer 26 which has a number of software application that may be loaded therein (described below). While a palmtop computer is preferred other personal computer apparatus may be used instead, such as a lap top computer or personal computer. However, a palmtop computer provides a convenient processing unit that is readily carried and transported. Many palmtop computers are available and personal digital assistant type computers may also be employed. The family may also have a personal computer 16 which can be used in conjunction with their PC Card as described hereinbelow. Information gathered during a typical meeting at a convenient location between the case manager 22 and family 10 and other participants, such as other agency representatives, is recorded in a planning document 30 on the case manager's palmtop computer 26. This planning document 30 provides a single interagency planning document when more than one agency is involved for the individual's treatment or education, thus desirably eliminating separate planning documents for each agency involved. The planning document 30 and possibly other documented information is downloaded onto the individual's PC Card 14 providing the family with a record of the planning document. Furthermore, the planning document and other information necessary for the coordination of services for the individual are stored in the case manager's PC Card 24. Upon successive meetings, the planning document 30 will be supplemented or modified and stored in the individual's and case manager's PC Cards 14 and 24. The PC Cards 14 and 24 may also have other information recorded therein such as personal assessments, intake/profile information on the individual, and resource information.

The family 10 has a record of the planning document 30 in their PC Card 14 which can be used when obtaining services from other agencies. For example, the family may need the services of Agency A. Upon meeting with the representatives of Agency A's, the information from the individual's PC Card 14 can be downloaded into Agency A's PC (personal computer) 40 using a conventional memory card reader. The information on the individual 12 is therefore provided electronically without the need for the family to fill out additional forms or paper work. If any additional information is needed by Agency A it can be added through their computer to complete their file. Agency A can thereafter download their file onto the individual's PC Card 14 to provide the individual 12 with a record of the file for their records or later use in dealings with this or other agencies. The family can deal with a plurality of agencies in this manner without the need for large quantities of paper changing hands.

Instead of meeting personally with agencies, the family 10 may deal with agencies electronically by transmitting the planning document 30 or other information stored in the individual's PC Card 14 by such means as electronic mail, electronic bulletin board or other telecommunicating means, for example. The family 10 using their personal computer 16 and modem may transmit the information directly to the desired agencies computer, such as shown as Agency B's PC 42. Agency B can seek any additional information needed over the phone from the family 10 or perhaps other agencies that may have been involved with this individual 12. Agency B can transmit back to the family personal computer 16 their documentation on the individual 12 to provide the family with a record of it. The family 10 can download Agency B's records or information into the individual's PC Card 14. The family also has the flexibility with their PC Card 14 to deal with agencies both in person or by telecommunications at various times during the families course of dealing with agencies. If an agency participates in a planning meeting, such as Agency C illustrated in FIG. 1, that agency may also have its information downloaded into the planning document 30 at that time, through the case manager's palmtop computer 26, for example.

The case manager 22 also has the planning document 30 stored in his PC Card 24 for individual 12. The case manager 22 may also have planning documents for other clients stored in his PC Card 24 which may be accessed at any time through his palmtop computer 26 or a laptop or other personal computer. Palmtop or laptop computers are portable and typically battery or self-powered. At any time the case manager may, by means of electronic bulletin boards or E-mail for example, electronically telecommunicate information in the individual's planning document 30 (or other information necessary in providing services to the individual 12) with another agency, such as Agency D 46 or Agency E 48. The case manager may also receive information from other agencies such as Agencies D and E which is used for the individual's planning document 30. The agencies may also communicate with other agencies in relation to the individual's planning document 30 such as shown in FIG. 1 between Agency E 48 and Agency F 50. It should be noted that the electronic exchange of client records between agencies is subject to the permission or approval of the client or the client's family.

As shown in FIG. 2, the case manager's palmtop computer 26 has a screen 60 for displaying information and a keyboard 62 for entering information into the palmtop computer. Other input means for handheld computers may include a stylus pen input or a software "virtual" keyboard for pen type input. The palmtop computer 26 may be connected to a modem 64 for telecommunicating information contained in the individual's planning document 30 to other agencies or to the family 10. This electronic communication may be provided by electronic mail or electronic bulletin boards. The palmtop computer 26 may also have connected thereto a PC Card reader 66 which is adapted to read the information in the PC Cards 14 or 24 or adapted to write information into these cards from the computer. A printer 68 may also be connected to the palmtop computer 26 to print a hard copy of the planning document 30 or other forms or information related to the services being provided by the case manager's agency or perhaps other agencies.

The case manager's palmtop computer may have certain software applications 70 loaded therein to facilitate the creation of the planning document 30 or other services to be provided, which software applications are illustrated in FIG. 2 and listed as follows: A Personal Information Management application 72 which may includes items used to assist in coordinating meetings and in keeping track of activities that must be performed in order to coordinate services for clients such as the individual 12. Such items may include an appointment schedule, to-do list application, and phone/address database, for example. Caseload Spreadsheet Database application 74 that assists in keeping track of a client caseload and basic information needed on a regular basis as the case managers 22 perform their case management functions which may include information such as name, school, date of birth, phone number, status at other agencies, date of graduation, next planning meeting dates, short notes. An Interdisciplinary Notetaker application 76 to record notes related to case management activities using a word processing program. This application may be used to record notes on going information and activities that are performed in the management of service coordination. These notes may be important for the continuity of case management and for recording the most up to date status of individual client cases. A Word Processing application 78 which is used to write to clients, families, other agencies, and to record assessments that may be necessary for service coordination. An Electronic Planning Document Database application 80 that allows the recording of planning documents of various agencies into a single multi-agency electronic form. This database may also provide the ability to generate customized reports on a particular client as well as composite reports on several clients. Common Interagency Intake/Profile Information Database application 82 which may be used to record basic demographic information and more detailed case information not intended to be recorded in the Interdisciplinary Notetaker application 76 above. An Assessment Database application 84 in a common cross-agency electronic format for recording assessment information available from various agencies which may be necessary to determine eligibility and service needs of the client. Resource Database application 86 which allows the case manager to record and store information on available resources that he (or she) uses in coordinating services for clients. This may include name, address, phone number, contact persons, description of services provided and individualized notes which can be made by the user related to the particular service. This application allows the case manager to carry a vast amount of resource information with them into the field or for instant access at the office. The Resource Database application 86 may also be available on the family or clients PC Card so that the family and client can also have access to personal resource information. Follow-up Database application 88 to record information necessary to follow-up with clients in order to track their progress and possible need for further services or interventions. Data Communications application 90 to facilitate access to the dynamic resource database and e-mail communication available on electronic bulletin board service (BBS) allowing agencies to communicate with other agencies and families, families with other families and agencies and offering access to internet resources.

Certain information stored in the planning document 30 in the individual's PC Card 14 may be coded such that it requires an access code to read the information. Such certain information may be sensitive information resulting from the treatment to the individual during the period of his planning document and may only be disclosed to selected agencies on an as needed basis. The family may grant access to such sensitive information by providing them with the necessary access code. Sensitive information can be protected using access codes by any number of well known conventional techniques.

The above-described detailed description of a preferred embodiment described the best mode contemplated by the inventor for carrying out the present invention at the time this application was filed and is offered by way of example and not by way of limitation. Accordingly, various modification may be made to the above-described preferred embodiment without departing from the scope of the invention. Accordingly, it should be understood that although the invention has been described and shown for a particular embodiment, nevertheless various changes and modifications obvious to a person of ordinary skill in the art to which the invention pertains are deemed to lie within the spirit and scope of the invention as set forth in the following claims.

What is claimed is:

1. In a method for creating and sharing an electronic planning document during a planning meeting between an individual, needing services from and/or being eligible to receive benefits from at least one of a plurality of agencies set up to provide services to such an individual, and a case manager representing at least one of the agencies, the planning document having a set of personal information including assessments and planning records regarding the individual, each of the agencies having computer systems for storing and retrieving information, the method comprising:

providing a memory card personalized to the individual;

providing a memory card to the case manager;

providing a portable computer to the case manager whereby the planning meeting may take place at any convenient location;

inputting information constituting the planning document for said individual into the case manager's portable computer during the planning meeting;

saving the planning document in the case manager's computer to a file in the case manager's memory card; and downloading at least a portion of the planning document in the case manager's computer into the individual's memory card, whereby the individual has ready access to said portion of the planning document and the ability to supply the information stored on his or her individual memory card to another one of said agencies for storage into said other agency's computer system, whereby the individual's dealings with other agencies is expedited.

2. The method of claim 1 including periodically inputting additional information to supplement and/or modify the planning document for said individual into the case manager's computer during subsequent planning meetings with the individual, saving the additional information in the case manager's memory card and downloading said additional information in the case manager's computer into the individual's memory card.

3. The method of claim 1 wherein the case manager is provided with a hand-held portable computer.

4. The method of claim 1 wherein the case manager is provided with a laptop portable computer.

5. The method of claim 1 wherein the case manager is provided with a palmtop portable computer.

6. The method of claim 1 further including machine reading the planning document from the case manager's memory card into the computer system of the agency with which the case manager is associated.

7. The method of claim 1 further including accessing resource information of value to the individual from the computer system of at least one of the agencies into the portable computer during the planning meeting.

8. The method of claim 1 wherein the case manager is provided with a portable computer in which information may be inputted by a stylus pen.

9. The method defined in claim 1 further comprising the step of providing database means in the portable computer containing information relevant to the planning meeting and services to be provided to the individual.

10. The method of claim 7 further including downloading at least a portion of said resource information into the individual's memory card during the planning meeting.

11. The method defined in claim 6 further comprising telecommunicating said document from the computer system of said one agency to computer system of another of the plurality of agencies.

12. The method defined in claim 6 further comprising the steps of:

providing a memory card associated with another agency, and storing in said another agency memory card said electronic planning document.

13. The method of claim 6 further including accessing the resource information with the portable computer remotely via a modem through an electronic bulletin board service (BBS) and/or the internet.

14. In a method for creating and sharing an electronic interagency planning document during a planning session between an individual, needing services from and/or being eligible to receive benefits from at least one of a plurality of agencies set up to provide services to such an individual, and a case manager representing at least one of the agencies, the planning document having a set of personal information including assessments, planning records and resource information pertinent to the individual, each of the agencies having computer systems for storing and retrieving information, the method comprising:

providing a memory card personal to the individual;

providing a memory card to the case manager;

providing a self-powered portable computer to the case manager whereby the planning meeting may take place in the field at a location convenient to the individual and case manager;

inputting information constituting the planning document for said individual into the case manager's portable computer and providing access codes with respect to certain of the information constituting the planning documents during the planning session;

saving the planning document in the case manager's computer to a file in the case manager's memory card; and downloading the planning document in the case manager's computer into the individual's memory card, whereby the individual has ready access to said planning document and the ability to supply the information stored on his or her individual memory card to another one of said agencies for storage into said other agency's computer system, whereby the individual's dealings with other agencies is expedited.

15. The method of claim 14 further including uploading the planning document from the case manager's memory card into the computer system of at least one agency.

16. The method of claim 15 further including transmitting the planning document into the computer systems of at least two agencies.

17. The method of claim 16 wherein the access codes are designed to limit access to the coded information to certain of the plurality of the agencies.

18. The method of claim 17 further including providing the identity of the access codes to the individual during the planning session to enable the individual to transmit the coded information to an agency to which the access code is not otherwise available.

19. In a method for creating and sharing an electronic planning document during a planning meeting between a handicapped individual, needing services from and/or being eligible to receive benefits from a plurality of agencies set up to provide services to such an individual, for his or her educational and vocational development and a case manager representing at least one of the agencies, the planning document having a set of personal information including assessments arid planning records regarding the individual, each of the agencies having computer systems for storing and retrieving information, the method comprising:

providing a personal memory card to be retained by the individual;

providing a memory card to be retained by the case manager;

providing a self-contained portable computer to the case manager whereby the planning meeting may take place at any convenient location;

storing resource information in the portable computer pertinent to services available from at least one of the agencies;

inputting information constituting the planning document for said individual into the case manager's portable computer during the planning meeting;

saving the electronic planning document in the case manager's computer to a file in the case manager's memory card;

downloading the electronic planning document in the case manager's computer into the individual's memory card, whereby the individual has ready access to the planning document and the ability to supply the information stored on his or her individual memory card to another one of said agencies for storage into said other agency's computer system, whereby the individual's dealings with other agencies is expedited; and machine reading the planning document from the case manager's card into the computer system of the agency with which the case manager is associated.

20. The method of claim 19 further including accessing resource data of value to the individual from the computer systems of at least one of the agencies during the planning meeting.

* * * * *

UNITED STATES PATENT AND TRADEMARK OFFICE
CERTIFICATE OF CORRECTION

PATENT NO.   : 5,552,586
DATED        : September 3, 1996
INVENTOR(S)  : Kalman

It is certified that error appears in the above-identified patent and that said Letters Patent is hereby corrected as shown below:

Column 7, line 49, after "said" should be the word --planning--.

Column 8, line 6, "personal" should read --personalized--.

Column 8, line 48, after "development" insert --,--.

Signed and Sealed this

Twenty-sixth Day of November 1996

Attest:

BRUCE LEHMAN

Attesting Officer    Commissioner of Patents and Trademarks